(12) United States Patent
Okubo et al.

(10) Patent No.: US 6,725,738 B2
(45) Date of Patent: Apr. 27, 2004

(54) GEAR SHIFT APPARATUS FOR MANUAL TRANSMISSION

(75) Inventors: Kiyokazu Okubo, Saitama-ken (JP); Takayuki Yakou, Saitama-ken (JP); Yasushi Onuma, Saitama-ken (JP); Keiji Nemoto, Saitama-ken (JP); Kazufumi Hosoda, Shizuoka-ken (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 113 days.

(21) Appl. No.: 10/178,394

(22) Filed: Jun. 25, 2002

(65) Prior Publication Data

US 2003/0000329 A1 Jan. 2, 2003

(30) Foreign Application Priority Data

Jun. 29, 2001 (JP) ........................................ 2001-198886

(51) Int. Cl.$^7$ ............................ F16H 61/18; B60K 20/00
(52) U.S. Cl. ................ 74/473.22; 74/473.24; 74/473.26
(58) Field of Search .................... 74/473.1, 473.21, 74/473.22, 473.24, 473.25, 473.26, 473.28, 473.23

(56) References Cited

U.S. PATENT DOCUMENTS

| | | | | |
|---|---|---|---|---|
| 2,745,526 A | * | 5/1956 | Saives | 192/221 |
| 4,126,055 A | * | 11/1978 | Forsyth | 74/473.22 |
| 5,566,581 A | * | 10/1996 | Smale et al. | 74/473.22 |
| 6,009,769 A | * | 1/2000 | Ikegami | 74/473.23 |
| 6,026,702 A | * | 2/2000 | Dreier et al. | 74/473.21 |
| 6,076,416 A | * | 6/2000 | Sputhe | 74/342 |
| 6,186,021 B1 | * | 2/2001 | Wollschlaeger | 74/473.22 |
| 6,474,188 B1 | * | 11/2002 | Edure et al. | 74/473.1 |

* cited by examiner

*Primary Examiner*—David A. Bucci
*Assistant Examiner*—Colby Hansen
(74) *Attorney, Agent, or Firm*—Westerman, Hattori, Daniels, & Adrian, LLP

(57) ABSTRACT

A gear shift apparatus for a manual transmission utilizes an actuator to prevent a miss shift manipulation from a forward gear stage to a reverse gear stage. The gear shift apparatus permits the driver to forcedly release a mis-shift preventing state with a smaller force. In the gear shift apparatus for a manual transmission, a select cam is responsive to a selecting manipulation to pivotally move to forward positions corresponding to forward select positions and a reverse position corresponding to a reverse select position. A restraint cam is driven to a prohibiting position by a plunger when a solenoid is energized to prohibit the select cam from pivotally moving to the reverse position. In this prohibiting state, as the select cam is pivotally moved toward a forward position in response to a manipulation for selecting a forward select position, a release protrusion of the select cam presses the restraint cam to pivotally move the same from the prohibiting state to a permitting position.

2 Claims, 13 Drawing Sheets

TRANSMISSION LEVER : NEUTRAL POSITION

TRANSMISSION LEVER : 1st-2nd SPEED SELECT POSITION

TRANSMISSION LEVER : 5th-6th SPEED SELECT POSITION
(REVERSE LOCK STATE)

TRANSMISSION LEVER : REVERSE SELECT POSITION

GEAR SHIFT APPARATUS FOR MANUAL TRANSMISSION

BACKGROUND OF THE INVENTION

1. Field of the Invention

The present invention relates generally to a gear shift apparatus for a manual transmission for use in a vehicle such as an automotive vehicle, and more particularly, to a gear shift apparatus for a manual transmission which comprises a mis-shift preventing mechanism for preventing a driver from erroneously operating the transmission from a forward gear stage to a reverse gear stage during forward running of the vehicle.

2. Description of the Prior Art

Conventionally, as a gear shift apparatus of the type mentioned above, one illustrated in FIGS. 1A–1D is known. This manual transmission has a shift pattern (for example, see FIG. 3) in which forward first through sixth gear stage positions are disposed at respective ends of three parallel lines, and an additional reverse gear stage position defined outside the fifth or sixth gear stage position in a select direction indicated in FIG. 3. The gear shift apparatus 80 also comprises an interlock 81 connected to a transmission lever (not shown) through a cable for pivotal movement associated with a selecting manipulation of the transmission lever in the select direction to perform a gear shift operation; and a solenoid (not shown) for restricting the pivotal movement of the interlock 81 to prevent a miss shift manipulation of the transmission lever from a forward gear stage position to the reverse gear stage position during forward running of the vehicle.

The interlock 81 is pivotable about a vertical axis to take the following four select positions associated with a selecting manipulation of the transmission lever. Specifically, the interlock 81 is pivoted to a first-second speed select position (a position indicated by solid lines in FIG. 1D) at which the first-speed or second-speed gear stage can be selected; a neutral position (a position indicated in FIG. 1A) at which the third-speed or fourth-speed gear stage can be selected; a fifth-sixth speed select position (a position indicated by solid lines in FIG. 1B) at which the fifth-speed or sixth-speed gear stage can be selected; and a reverse select position (a position indicated in FIG. 1C) at which the reverse gear stage can be selected.

The interlock 81 also comprises two cams 82, 83 which are spaced apart from each other. The cam 83 has an inclined cam face 83a which opposes the cam 82.

The solenoid is electrically connected to a controller, not shown, which turns the solenoid ON when the vehicle speed is equal to or higher than a predetermined vehicle speed and OFF when the vehicle speed is lower than the predetermined vehicle speed. A pin 84 is coupled to a leading end of a plunger of the solenoid, and is urged upward by a return spring, not shown. This causes the pin 84 to move in the vertical direction as the solenoid is turned ON/OFF (energized/deenergized), and holds the pin 84 at a lower restraint position (see FIGS. 1A, 1B) when the solenoid is ON and at an upper release position (see FIG. 1C) when the solenoid is OFF. As illustrated in FIG. 1A, the pin 84 is positioned between both cams 82, 83 when the pin 84 is held at the restraint position with the interlock 81 remaining at the neutral position.

In the gear shift apparatus 80, the interlock 81 operates associated with a selecting manipulation of the transmission lever, as described below. Specifically, when the vehicle speed is lower than the predetermined vehicle speed, the pin 84 is held at the release position, thereby permitting the interlock 81 to smoothly pivot to any of the aforementioned four select positions associated with a selecting manipulation of the transmission lever, without hitting the pin 84.

On the other hand, when the vehicle speed is equal to or higher than the predetermined vehicle speed, the pin 84 is held at the restraint position, in which case the cam 82 abuts to the pin 84 as illustrated in FIG. 1B when the interlock 81 is pivotally moved from the neutral position to the fifth-sixth speed select position, associated with a selecting manipulation of the transmission lever. As a result, the interlock 81 is blocked from pivoting to the reverse select position illustrated in FIG. 1C, thereby preventing a miss shift manipulation to the reverse gear stage position during forward running.

As the interlock 81 is pivotally moved from the neutral position to the first-second speed select position, the cam 83 abuts to the pin 84 as illustrated in FIG. 1D to forcedly push up the pin 84 through the cam face 83a. Consequently, the interlock 81 is permitted to pivotally move to the first-second speed select position, with the result that a selecting manipulation (shifting manipulation) can be made to the first-speed or second-speed gear stage by the transmission lever.

Further, when the pin 84 is erroneously held at the restraint position due to the stuck solenoid, in spite of the vehicle speed lower than the predetermined vehicle speed, the pin 84 is also pushed up forcedly by the cam face 83a by a pivotal movement of the interlock 81 from the neutral position to the first-second speed select position, associated with a selecting manipulation of the transmission lever. This can forcedly release an erroneous gear shift disabled state, in which the transmission lever cannot be shifted to the reverse gear stage position, due to a stuck electromagnetic actuator or the like, thus permitting a gear shift manipulation to the reverse gear stage position.

In the conventional gear shift apparatus 80, a horizontal force (moment) generated by a pivotal movement of the interlock 81 about the vertical axis is converted to a vertical force for pushing up the pin 84 through the inclined cam face 83a, when the pin 84 is pushed up, in order to forcedly release the gear shift preventing state. Thus, due to an extremely small vertical component force relative to the horizontal force acting on the pin 84 from the cam face 83a, a large force is required for manipulating the transmission lever for selection, when the gear shift preventing state is forcedly released, resulting in a problem that the driver has a bad manipulation feeling.

OBJECT AND SUMMARY OF THE INVENTION

The present invention has been made to solve the foregoing problem, and it is an object of the invention to provide a gear shift apparatus for a manual transmission which utilizes an actuator to prevent a miss shift manipulation from a forward gear stage to a reverse gear stage, wherein the gear shift apparatus allows a driver to perform a selecting manipulation with a small force for forcedly releasing a miss shift preventing state and therefore have a light gear shift feeling.

To achieve the above object, the present invention provides a gear shift apparatus for a manual transmission having a shift pattern comprised of a plurality of forward select positions for selecting a plurality of forward transmission gear stages, respectively, and a reverse select position arranged outside said plurality of forward select positions for selecting a reverse transmission gear stage, for selecting one of said plurality of forward transmission gear stages and said reverse transmission gear stage through a selecting manipulation and a shifting manipulation.

The gear shift apparatus of the present invention is characterized by comprising a select cam responsive to the selecting manipulation to pivotally move to a plurality of forward positions and a reverse position corresponding to the plurality of forward select positions and the reverse select position, respectively, to permit a selection by the shift manipulation from the plurality of forward transmission gear stages and the reverse transmission gear stage; a restraint cam pivotally movable between a prohibiting position at which the restraint cam comes into engagement with the select cam to prohibit the select cam from pivotally moving to the reverse position, and a permitting position at which the restraint cam is retraced from the prohibiting position to permit the select cam to pivotally move to the reverse position; urging means for urging the restraint cam toward the permitting position; an actuator coupled to the restraint cam, the actuator having a moving element for driving the restraint cam from the permitting position to the prohibiting position; and prohibition releasing means for pressing the restraint cam into a pivotal movement from the prohibiting position to the permitting position when the select cam is pivotally moved toward a forward position in response to the selecting manipulation toward a forward select position while the select cam is prohibited from pivotally moving to the reverse position by the restraint cam remaining at the prohibiting position.

In the gear shift apparatus described above, the urging means may be a twisted coil spring, and the actuator may be a solenoid which has a plunger as the moving element.

According to this gear shift apparatus for a manual transmission, the restraint cam is held at the permitting position by an urging force of the urging means when the actuator is inoperative, permitting the select cam to pivotally move to the reverse direction, so that the transmission can be shifted to the reverse transmission gear stage. On the other hand, as the actuator is driven, the restraint cam is pressed by the moving element from the permitting position to the prohibiting position against an urging force of the urging means, thereby prohibiting the select cam from pivotally moving to the reverse position. As a result, the driver is prohibited from performing a manipulation for selecting the reverse select position, to prevent an erroneous shift to the reverse transmission gear stage.

When the driver performs a manipulation for selecting a forward select position for selecting a forward transmission gear stage in the miss shift preventing state in which the restraint cam is held at the prohibiting position, the prohibition releasing means of the select cam responsively presses the restraint cam into a pivotal movement from the prohibiting position to the permitting position. Thus, the moving element can be moved from the prohibiting position to the permitting position together with the restraint cam against a driving force of the actuator. Therefore, even if a shift to the reverse transmission gear stage is erroneously disabled due to the actuator which is stuck when the restraint cam remains at the prohibiting position, such a situation can be released by force. In this event, since two cams are used, the gear shift disabled state can be forcedly released in an efficient manner through the transmission of a torque from the pivotally moved select cam to the restraint cam, as compared with the conventional release operation which relies on the transmission of a horizontal force as a vertical force through a cam face. Consequently, the miss shift preventing state or gear shift disabled state can be released with a much lighter force than before.

Preferably, in the gear shift apparatus for a manual transmission described above, the distance between the center of pivotal movement of the restraint cam and a location of the select cam pressed to the prohibition releasing means is set to be longer than the distance between the center of pivotal movement of the restraint cam and a location of the restraint cam contacted to the moving element.

According to this preferred embodiment of the gear shift apparatus for a manual transmission, since the distance between the center of pivotal movement of the restraint cam and a location of the select cam pressed to the prohibition releasing means is set to be longer than the distance between the center of pivotal movement of the restraint cam and a location of the restraint cam contacted to the moving element, the restraint cam can be driven with a smaller torque of the select cam in accordance with the principles of lever during a selecting manipulation. As a result, the miss shift preventing state or erroneous gear shift disabled state can be released with a yet smaller force than before, permitting the driver to have a lighter gear shift feeling.

DETAILED DESCRIPTION OF THE EMBODIMENT

Figure 1:
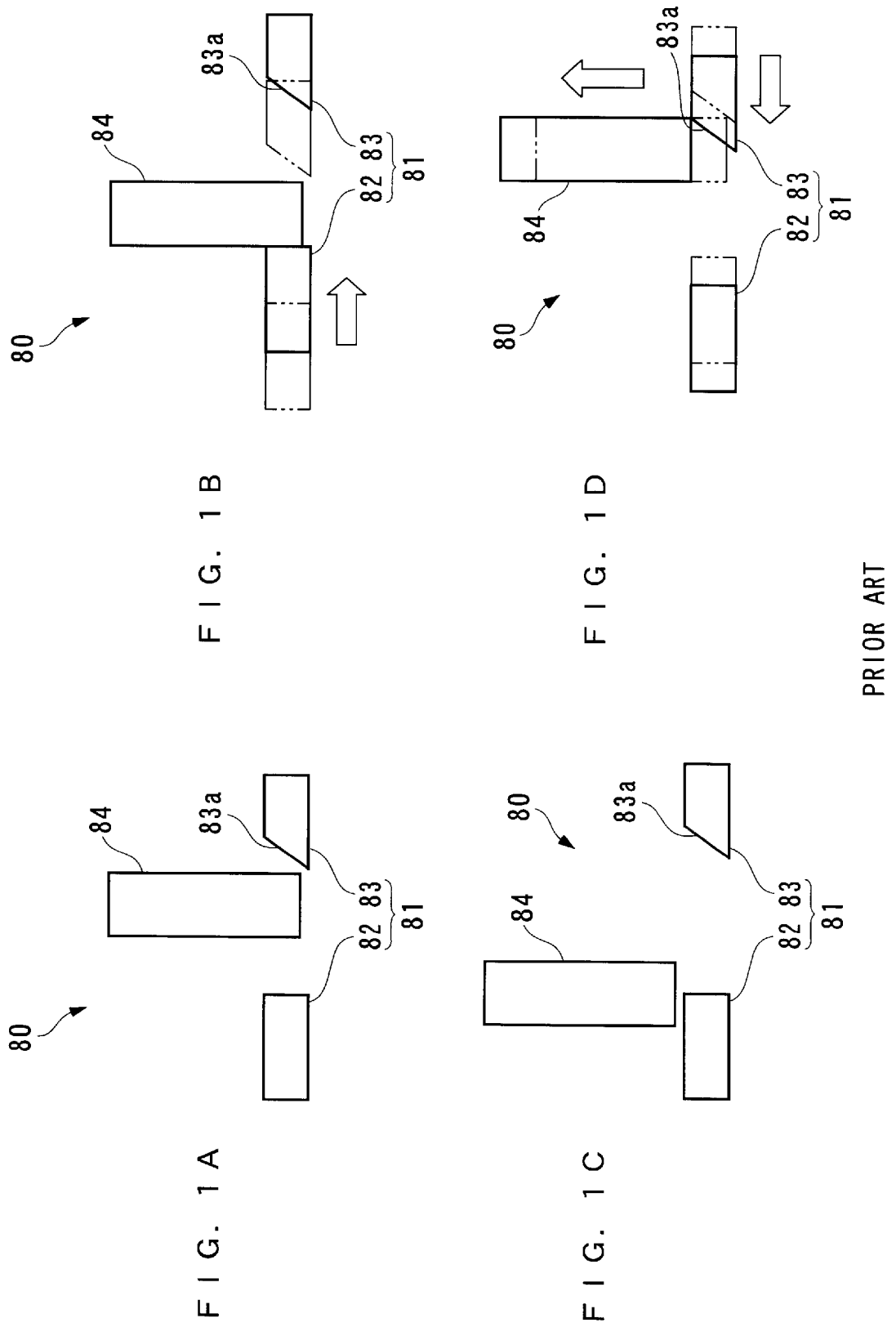
FIGS. 1A–1D are explanatory diagrams showing the operation of a conventional gear shift apparatus for a manual transmission.
Figure 2:
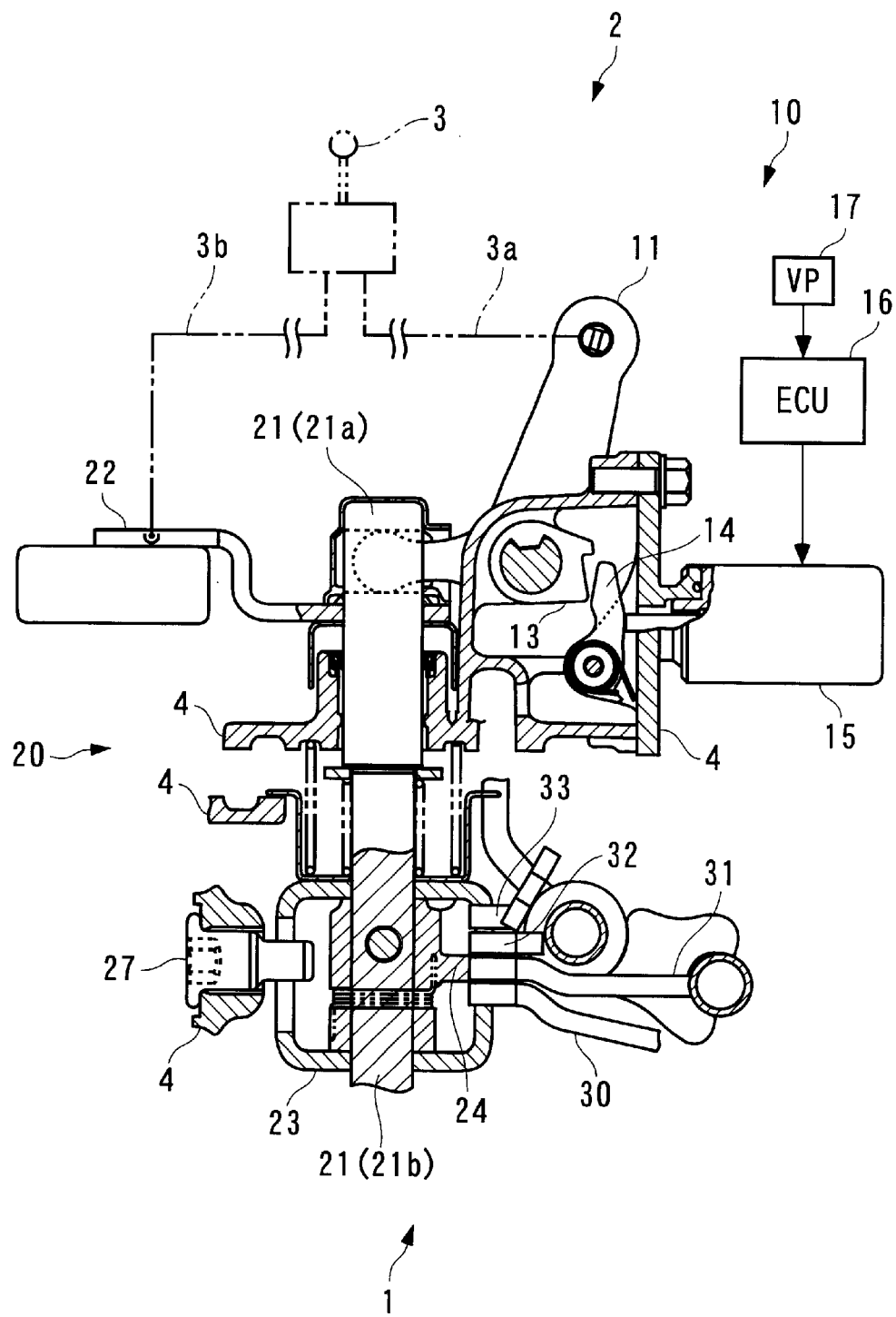
FIG. 2 is a partially broken front view generally illustrating the configuration of a gear shift apparatus according to one embodiment of the present invention, and a manual transmission to which the gear shift apparatus is applied.

In the following, a gear shift apparatus for a manual transmission according to one embodiment of the present invention will be described with reference to the accompanying drawings. FIG. 2 generally illustrates the configuration of a gear shift apparatus according to one embodiment, and a manual transmission to which the gear shift apparatus is applied. Assume, in the following description, that the near side and far side in FIG. 2 are called the front side and rear side, respectively, and the left side and right side in the figure are called the left side and right side, respectively.

The illustrated manual transmission 2, which is equipped in a vehicle, not shown, comprises a transmission lever 3; a case 4 made up of a clutch case, a transmission case, and the like which are integrated into a single assembly; a gear shift apparatus 1 mounted to the case 4; a transmission gear train (not shown) contained in the case 4; and the like.

Figure 3:
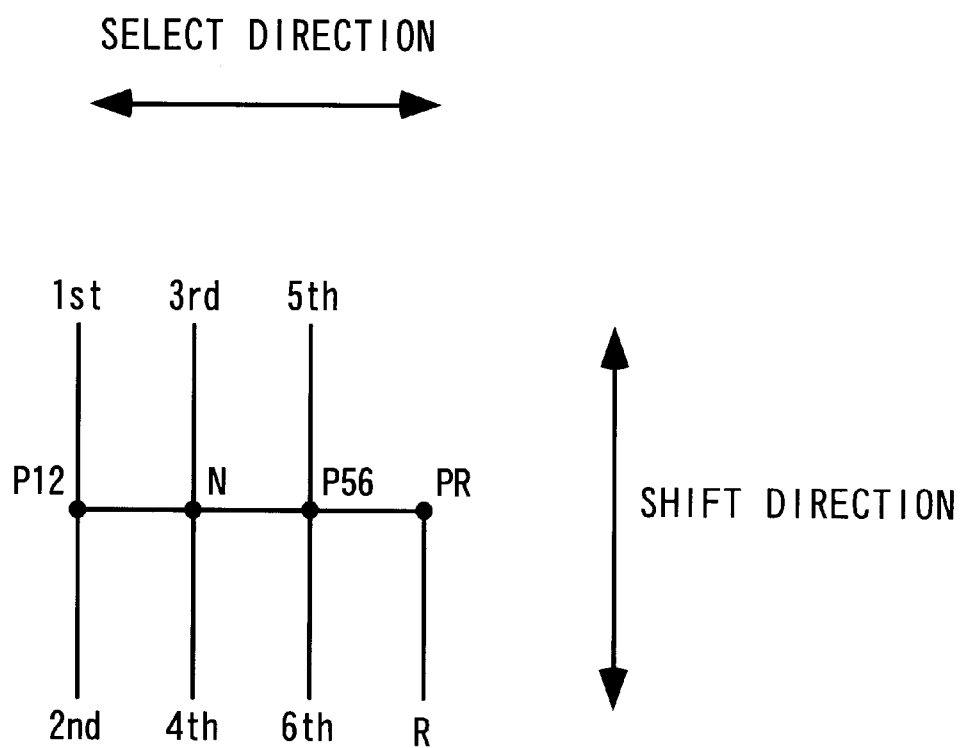
FIG. 3 is a schematic diagram illustrating a shift pattern for a manual transmission.

The manual transmission 2 is classified as a so-called remote control type, wherein the transmission lever 3 is connected to the gear shift apparatus 1 through transmission cables 3a, 3b. The manual transmission 2 comprises forward first through sixth gear stages and one reverse gear stage. As illustrated in FIG. 3, the manual transmission 2 has forward first through sixth gear stage positions (hereinafter called the "first through sixth speed positions") 1st–6th arranged at respective ends of three parallel lines centered at a neutral position N, and a reverse gear stage position (hereinafter called the "reverse position") R disposed outside of the forward stage positions in a select direction indicated by double-headed vertical arrows in FIG. 3.

Specifically, a first-second speed select position P12 (forward select position) for selecting the first or second speed position 1st, 2nd; the neutral position N (forward select position) for selecting the third or fourth speed position 3rd, 4th; a fifth-sixth speed select position P56 (forward select position) for selecting the fifth or sixth speed position 5th, 6th; and a reverse select position PR (reverse select position) for selecting the reverse position R are arranged in order in the select direction. The transmission lever 3 is manipulated to select any of these first-second speed select position P12, neutral position N, fifth-sixth speed select position P56, and reverse select position PR (this manipulation may also be called the "selecting manipulation"). Then, the transmission lever 3 is shifted to select any of the first through sixth speed positions 1st–6th and reverse position R.

The gear shift apparatus 1 in turn comprises a select lever device 10, a shift lever device 20, and the like. As described later, the select lever device 10 additionally has a reverse lock function for preventing a miss shift manipulation to the reverse position R, and comprises a select lever 11, a select cam 13, a restraint cam 14, a solenoid 15, an ECU 16, a vehicle speed sensor 17, and the like, as illustrated in FIGS. 4 through 8.

Figure 4:
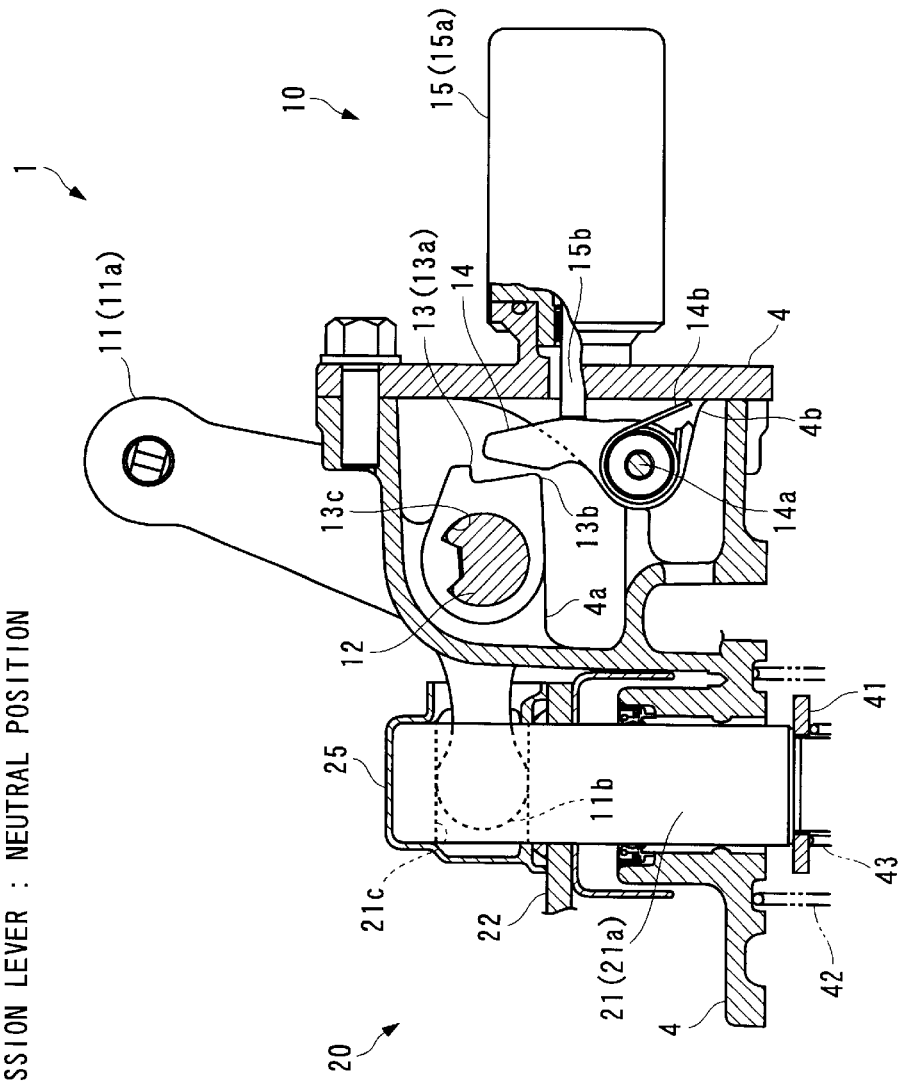
FIG. 4 is a partially cross-sectional side view showing the state of a select lever device when a transmission lever is at a neutral position.

As can be seen in FIG. 4, the select lever 11 is made up of a lever 11a and an arm 11b which are integrally formed into an L-shape, and is fixed to a pivot shaft 12. The pivot shaft 12, which is generally circular and partially recessed in cross section, extends through a rib 4a of the case 4 in a longitudinal direction, and is mounted thereto for pivotal movement about a horizontal axis. In this structure, the select lever 11 is made pivotable about the horizontal axis.

Figure 8:
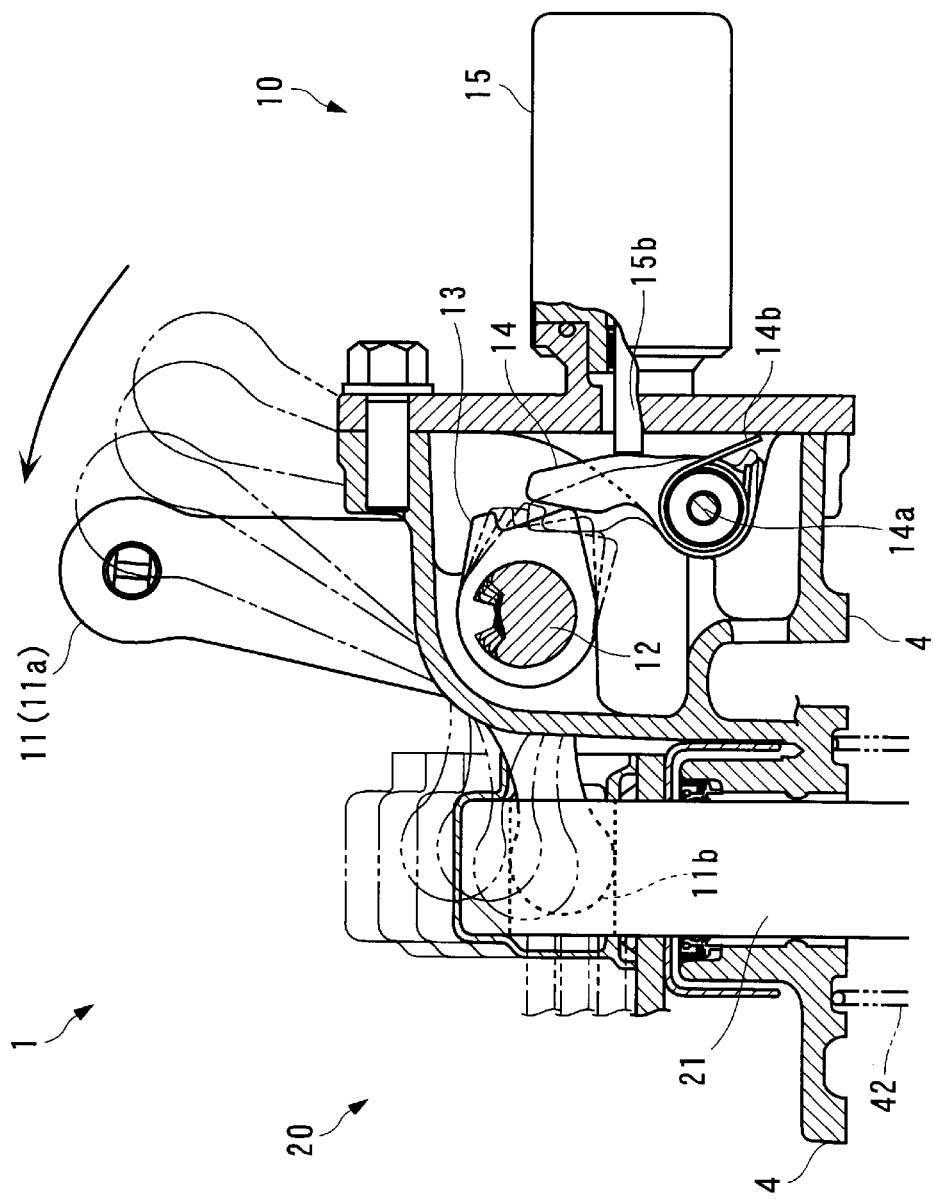
FIG. 8 is a partially cross-sectional side view showing how the select lever device operates when the transmission lever is manipulated from the reverse select position to the first-second speed select position for selecting this position.

The lever 11a of the select lever 11 has a leading end connected to the transmission lever 3 through the transmission cable 3a, so that the select lever 11 is responsive to the transmission lever 3 manipulated for selection to pivotally move to one of four corresponding positions, as illustrated in FIG. 8. Specifically, the select lever 11 is pivotally moved to a neutral corresponding position (see FIG. 4) when the transmission lever 3 is manipulated to select the neutral position N; to a first-second speed corresponding position (see FIG. 5) when manipulated to select the first-second speed select position P12; to a fifth-sixth speed select position (see FIG. 6) when manipulated to select the fifth-sixth speed select position P56; and to a reverse corresponding position (see FIG. 7) when manipulated to select the reverse select position PR.

The arm 11b of the select lever 11 is coupled to a shift rod 21, later described, to slide the shift rod 21 up and down as the select bar 11 is pivotally moved associated with a selecting manipulation of the transmission lever 3.

The select cam 13 in turn has an inner hole 13c similar to the pivot shaft 12 in the cross-sectional shape, such that the pivot shaft 12 is fitted into the inner hole 13c to fix the select cam 13 to the pivot shaft 12. With this structure, the select cam 13 is pivotally moved together with the select lever 11. The select cam 13 has a cam face formed with a stop protrusion 13a and a release protrusion 13b (prohibition releasing means).

The restraint cam 14 is arranged in close proximity to the select cam 13, and pivotably attached to the rib 4b of the case 4 through a pivot shaft 14a which is parallel with the pivot shaft 12. The restraint cam 14 is also urged by a twisted coil spring 14b (urging means) in a clockwise direction in FIG. 4. These restraint cam 14 and select cam 13 are arranged to pivotally move within the same plane as each other.

The solenoid (actuator) 15 is arranged in close proximity to the restraint cam 14, and comprises a solenoid body 15a which contains an electromagnetic coil; and a plunger 15b (moving element) movable closer to and away from the solenoid body 15a. The restraint cam 14 is in contact with a leading end of the plunger 15b by an urging force of the twisted coil spring 14b.

The solenoid 15 is electrically connected to the ECU 16, such that the plunger 15b protrudes toward the restraint cam 14 when the solenoid 15 is turned ON (energized) by a driving signal of the ECU 16. Consequently, the restraint cam 14 is held at a prohibiting position shown in FIG. 6. In this state, as the select cam 13 is pivotally moved toward the reverse corresponding position, the stop protrusion 13a comes into contact with the restraint cam 14 to block the select cam 13 from pivotally moving to the reverse corresponding position. Thus, the select cam 13 is stopped at the fifth-sixth speed corresponding position (see FIG. 6). In this manner, the select lever 11 is prohibited from a manipulation for selecting the reverse select position PR, and is brought into a reverse lock state in which the select lever 11 is prevented from a miss shift manipulation to the reverse position R.

On the other hand, when the solenoid 15 is OFF (deenergized), the plunger 15b is pushed into the solenoid body 15a by the urging force of the twisted coil spring 14b to hold the restraint cam 14 at a permitting position shown in FIG. 4. In this state, the select cam 13 is pivotally moved to one of the aforementioned four corresponding positions associated with a pivotal movement of the select lever 11, without being impeded by the restraint cam 14, i.e., held in a reverse lock released state.

The vehicle speed sensor 17 (running state detecting means), which is connected to the ECU 16, detects the speed of the vehicle (hereinafter called the "vehicle speed") VP and outputs a detection signal indicative of the detected vehicle speed to the ECU 16. The ECU 16 (control means) comprises a microcomputer to control the solenoid 15 ON/OFF based on the detection signal of the vehicle speed sensor 17. Specifically, the ECU 16 turns ON the solenoid 15 when the vehicle speed VP is equal to or higher than an upper predetermined speed VP1 (for example, 20 km/h) to prohibit a manipulation of the transmission lever 4 for selecting the reverse position R. On the other hand, the ECU 16 turns OFF the solenoid 15 when the vehicle speed VP is equal to or lower than a lower predetermined speed VP2 (for example, 15 km/h) or when an ignition key is off to permit a manipulation of the select lever 11 for selecting the reverse position R. In the foregoing manner, the ECU 16 controls the solenoid 15 to prevent a miss shift manipulation to the reverse position R and release the prevention in accordance with the vehicle speed VP.

The shift lever device 20 comprises a shift rod 21 extending in the vertical direction; a shift lever 22, an interlock 23, and a shift arm 24 respectively attached to the shift rod 21; and the like.

The shift rod 21 comprises an upper portion 21a having a larger diameter, and a lower portion 21b having a smaller diameter than the upper portion 21a, which are integrally formed into a rod shape. The shift rod 21 is attached to the case 4 for sliding movement in the vertical direction and for pivotal movement about the vertical axis. The larger diameter portion 21a is formed with a hole 21c which extends through an upper end portion thereof from left to right. The arm 11b of the aforementioned select lever 11 is inserted into the hole 21c for engagement with the shift rod 21. Thus, the shift arm 24 is vertically slid associated with a pivotal movement of the select lever 11 to one of the four corresponding positions to bring the shift rod 21 into engagement with a piece 30c–33c of four shift fork 30–33, as later described.

Grease is filled in a gap between the wall of the hole 21c and the arm 11b. The grease is provided to reduce a sliding resistance which is generated when the arm 11b is relatively slid along the wall of the hole 21c associated with a pivotal movement of the select lever 11 or a pivotal movement of the shift lever 22. An upper end of the shift rod 21 is covered with a cover 25 which prevents dust and the like from mixing into the grease.

The shift lever 22 is arranged at a position in contact with a lower edge of the cover 25, and fixed to the larger diameter portion 21a by welding. The shift lever 22 is bent in a crank shape from the shift rod 21 to the outside, and the transmission lever 3 is connected to a leading end thereof through the transmission cable 3b. In this structure, the shift lever 22 pivotally moves the shift rod 21 about the vertical axis associated with the transmission lever 3 shifted by the driver.

Figure 9:
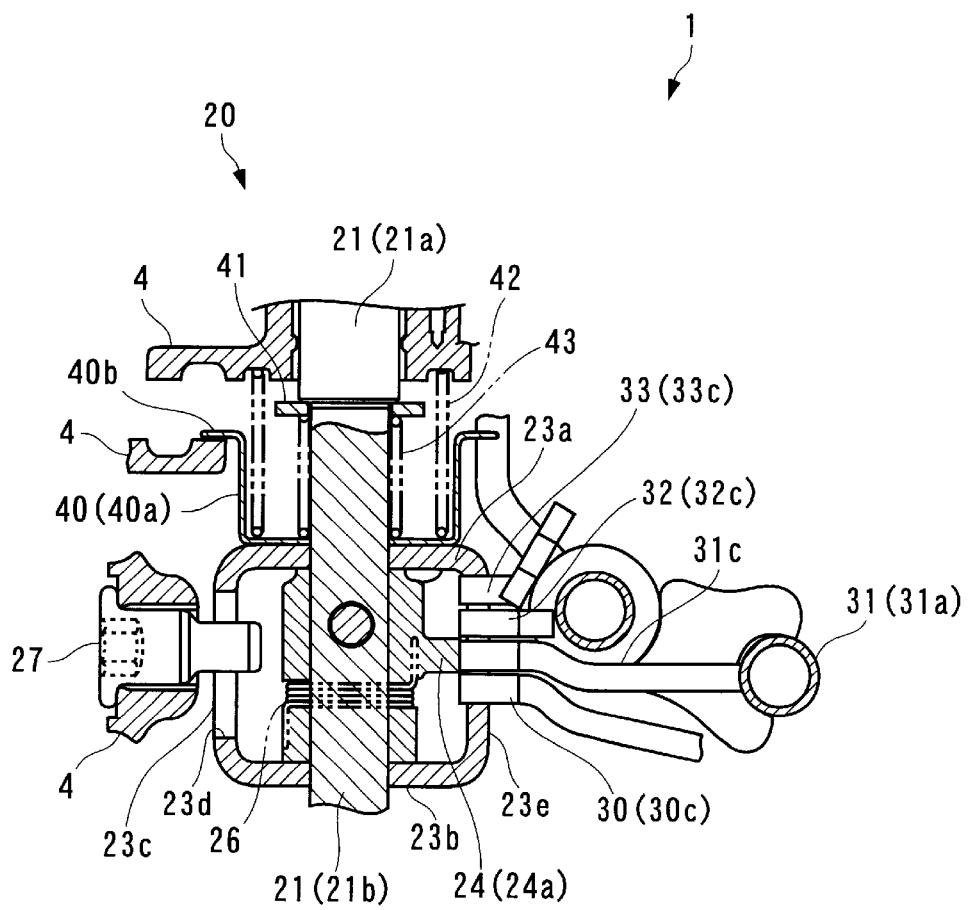
FIG. 9 is a partially broken front view illustrating a shift arm and its surroundings when the transmission lever is at the neutral position.
Figure 10A:
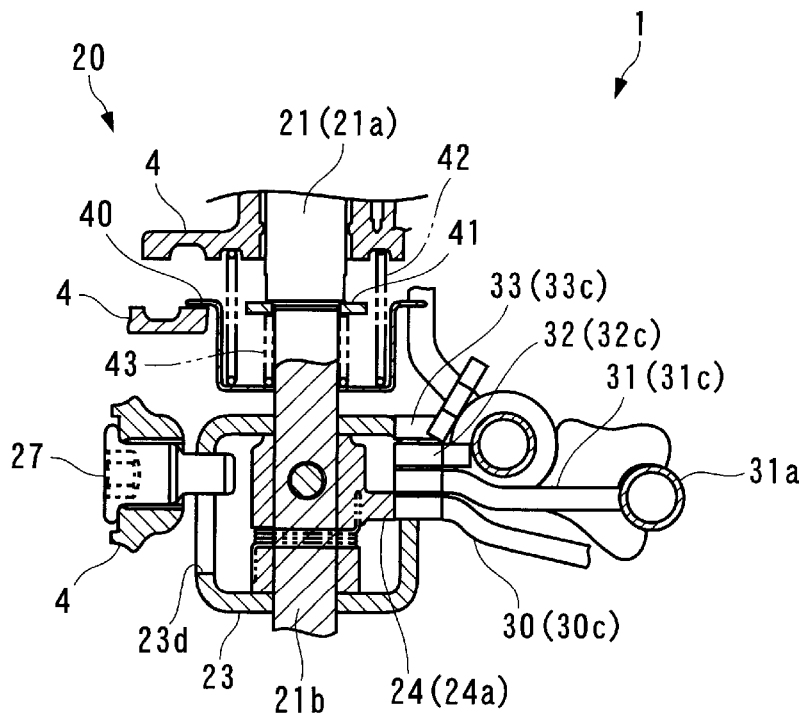
FIGS. 10A and 10B are partially broken front views illustrating the shift arm and its surroundings when the transmission lever is at the first-second speed select position (A), and when the transmission lever is at the fifth-sixth speed select position (B)
Figure 10B:
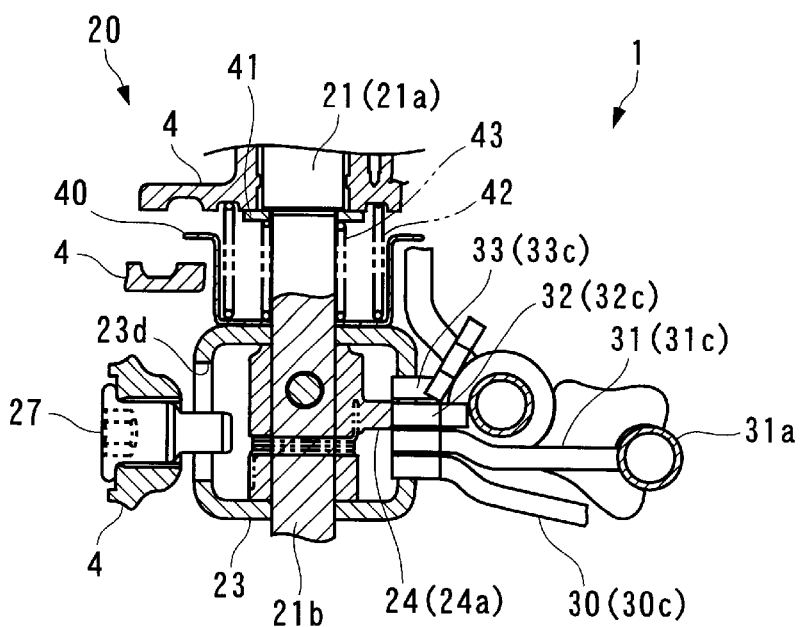
Figure 11:
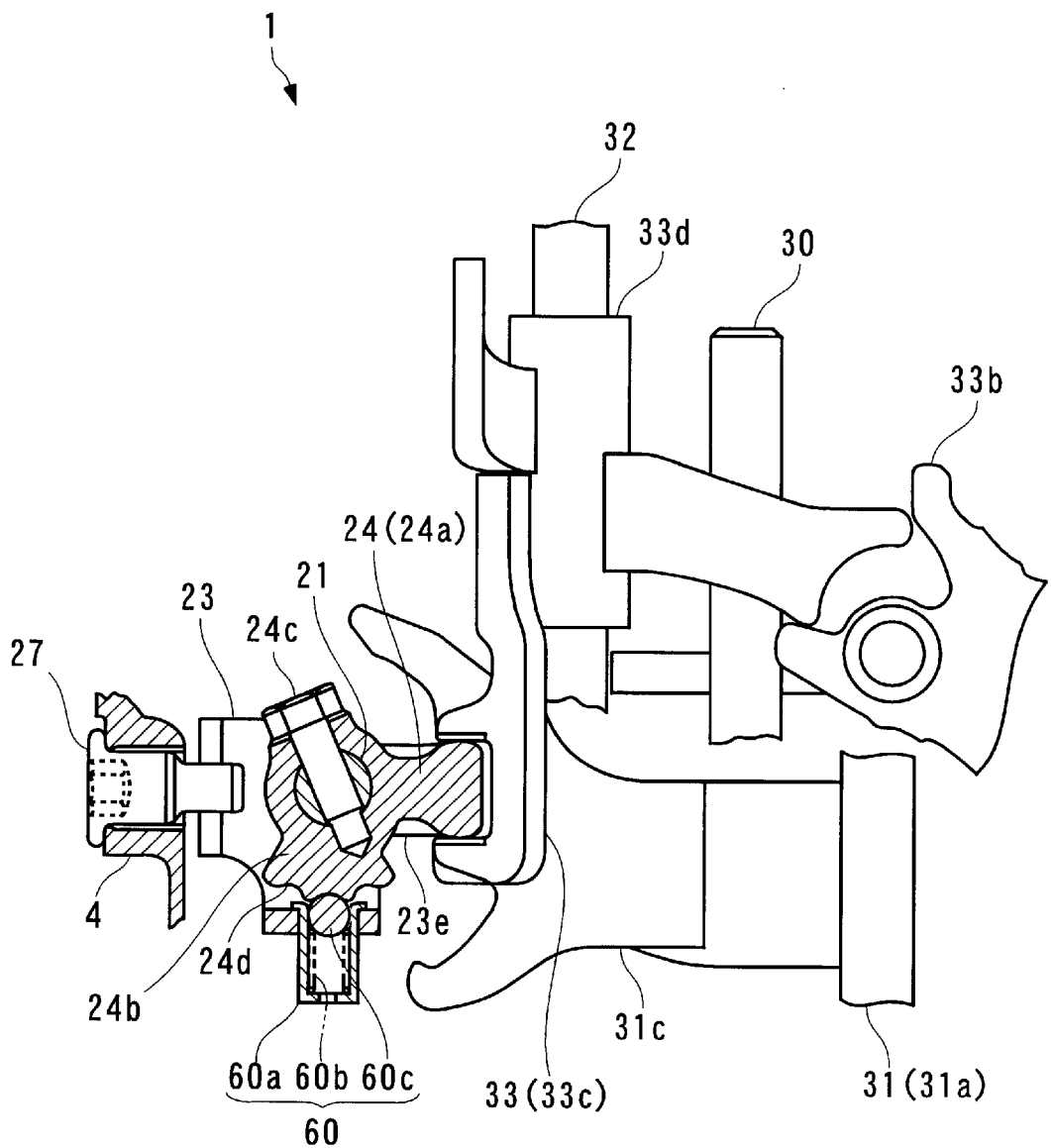
FIG. 11 is a partially broken plan view illustrating surroundings of the shift arm when the transmission lever is at the neutral position.

As illustrated in FIGS. 9 through 11, the shift arm 24 is made up of an arm 24a and a cam 24b which are integrally formed into the shift arm 24, and is fixed to the smaller diameter portion 21b of the shift rod 21 through a bolt 24c. The arm 24a, which protrudes to the right from the shift rod 21, is arranged to be selectively engageable with the pieces 30c–33c of the four shift forks 30–33, later described. The cam 24b protrudes in front, and has a cam face formed on its front face. The cam face is formed with three, i.e., central, left and right recesses 24d which are arranged at equal intervals.

A detent 60 is provided at a location of the interlock 23 corresponding to the cam 24b. The detent 60 is made up of a cylindrical case 60a, a coil spring 60b, a ball 60c, and the like. The ball 60c protrudes outward from an opening of the case 60a by an urging force of the coil spring 60b, and is in engagement with the central recess 24d of the cam 24b when the transmission lever 3 is at the neutral position N (see FIG. 11).

The cam 24b is pivotally moved against the urging force of the coil spring 60b of the detent 60, associated with a pivotal movement of the shift rod 21 caused by a shifting manipulation of the transmission lever 3, and comes into engagement with one of the three recesses 24d. Simultaneously with the pivotal movement of the cam 24b, the arm 24a is pivotally moved as well.

The shift arm 24 is wound with a return spring 26. The return spring 26 comprises a twisted coil spring, the upper end of which is coupled to the shift arm 24, and the lower end of which is coupled to the interlock 23. The shift arm 24 is held at positions shown in FIGS. 9 and 11 by an urging force of the return spring 26 when the transmission lever 3 is not shifted, for example, when the transmission lever 3 is at the neutral position N.

The interlock 23 is arranged to surround the shift arm 24, and comprises upper and lower horizontal walls 23a, 23b, and a left wall 23c extending in the vertical direction. The shift arm 24 is fitted between the upper and lower walls 23a, 23b. Holes having the same diameter are formed in central portions of the walls 23a, 23b in opposition to each other, and the shift rod 21 extends vertically through these holes. The interlock 23 further comprises two guide arms 23e which extend to the shift arm 24 from rear ends of the upper and lower walls 23a, 23b, respectively.

The left wall 23c is formed with an elongated hole 23d. The elongated hole 23d has a predetermined dimension and extends in the vertical direction. An interlock bolt 27 is attached to the case 4 at a position close to the interlock 23. The interlock bolt 27 extends in the horizontal direction, with its leading end fitted into the elongated hole 23d. In this structure, when the interlock 23 is slid together with the shift rod 21 in the vertical direction, the edge of the elongated hole 23d comes into contact with the interlock bolt 27 to restrict the distance over which the interlock 23 can be slid in the vertical direction. Also, the interlock 23 is restricted by the case 4 so as not to accompany the shift rod 21, when it is pivotally moved.

The four shift forks 30–33 for first-second speeds, for third-fourth speeds, for fifth-sixth speeds, and for reverse are provided on the right side of the shift arm 24 at positions close thereto. Since the three shift forks 30–32 are constructed in a similar manner to one another with partial exceptions, the following description will be centered on the third-fourth speed shift fork 31 as representative of these forks 30–32.

Figure 12:
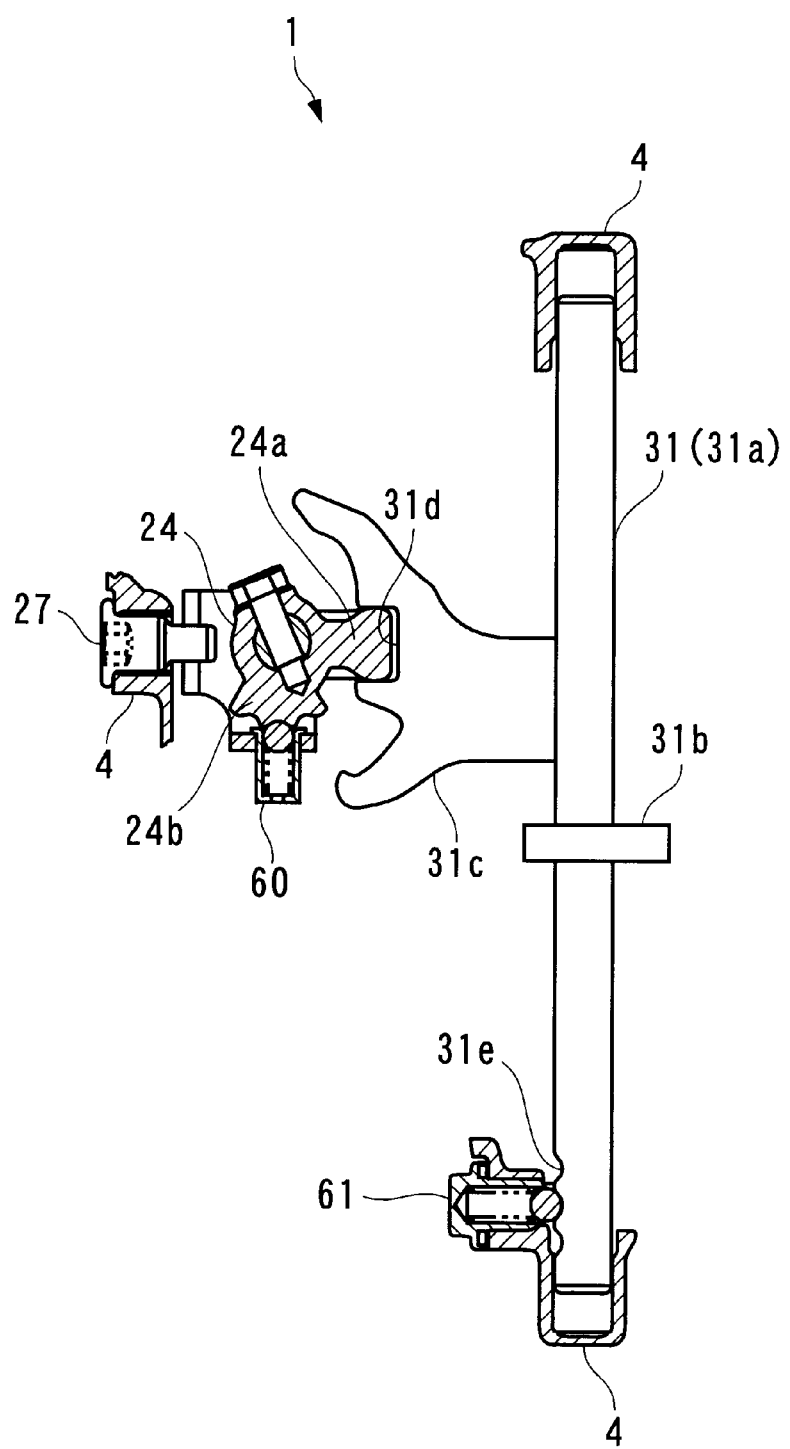
FIG. 12 is a partially broken plan view illustrating a third-fourth speed shift fork and the shift arm.

As illustrated in FIG. 12, the third-fourth speed shift fork 31 is made up of a shaft 31a, a fork 31b and the piece 31c which are integrally formed into the shift fork 31. The shaft 31a, which is hollow and extends in the longitudinal direction, is arranged for sliding movement in the longitudinal direction within a predetermined range. The shaft 31a is formed with three, i.e., front, intermediate and rear recesses 31e in a leading end portion thereof. A detent 61 substantially similar to the detent 60 is provided at a location of the case 4 corresponding to these recesses 31e. As one of the recesses 31e is brought into engagement with the detent 61, the third-fourth speed shift fork 31 is stopped at a position corresponding to the engaged recess 31e.

The fork 31b is fixed in a central portion of the shaft 31a, extends outward, and is fitted in a groove of a synchro-clutch of the transmission gear train (these components are not shown).

The piece 31c extends from the shaft 31a to the shift arm 34, with a recess 31d formed at a leading end portion thereof. The width and depth of the recess 31d are set such that the arm 24a of the shift arm 24 or the leading end of the guide arm 23e of the interlock 23 is brought into engagement with the recess 31d with a slight gap between itself and the recess 31d. When the transmission lever 3 is at the neutral position N, the arm 24a is in engagement with the recess 31d.

Likewise, the three shift forks 30, 32, 33 for first-second speeds, for fifth-sixth speeds and for reverse comprise pieces 30c, 32c, 33c which extend toward the shift arm 24, similar to the piece 31c, respectively. These four pieces 30c–33c are arranged in this order along the vertical direction (see FIGS. 9, 10). Each of the pieces 30c, 32c, 33c is also formed with recesses (one of which is illustrated) similar to the recesses 31d, such that the shift arm 34 is fitted into a corresponding recess when the transmission lever 3 is manipulated to select one of the first-second speed select position P12, fifth-sixth speed select position P56, and reverse select position PR.

As the shift arm 24 is pivotally moved in the clockwise or counter-clockwise direction in FIG. 12 with the arm 24a fitted in the recess 31d as described above, the third-fourth speed shift fork 31 is slid in front or to the rear, causing the synchro-clutch to slide in front or to the rear through the fork 31b to couple a counter shaft (not shown) to a main shaft (not shown) through the transmission gear train which constitutes a fourth speed gear pair or a third speed gear pair. In other words, a gear shift is performed to the fourth speed gear stage or third speed gear stage.

The first-second speed and fifth-sixth speed shift forks 30, 32 operate in a similar manner to the third-fourth speed shift fork 31, respectively, by a pivotal movement of the shift arm 24.

The reverse shift fork 33, on the other hand, comprises a slider 33d to which the piece 33c is fixed; a pivotable fork 33b coupled to the slider 33d; and the like. The slider 33d is arranged on the fifth-sixth speed shift fork 32 for sliding movement in the longitudinal direction. When the transmission lever 3 is shifted from the neutral position N to the reverse position R, the slider 33d is pushed in front, i.e., slid by the shift arm 24 through the piece 33c. The sliding movement of the slider 33d is accompanied by a pivotal movement of the fork 33d in the clockwise direction in FIG. 11 to bring a reverse idle gear, not shown, into mesh with a fixed reverse gear for a shift to the reverse gear stage.

A pair of larger and smaller spring seats 40, 41 are provided above the interlock 23. The larger spring seat 40 is made up of a cylindrical base 40a, and a flange 40b extending radially to the outside from the upper end of the base 40a, which are integrally formed into the larger spring seat 40. The base 40a is formed with a hole through a bottom wall thereof, through which the larger spring seat 40 is fitted into the smaller diameter portion 21b of the shift rod 21. The smaller spring seat 41 in turn is formed in a ring shape, and is fitted into the smaller diameter portion 21b.

Two larger and smaller return springs 42, 43 are fitted between the case 4 and the larger spring seat 40 and between the spring seats 40, 41, respectively. These return springs 42, 43 comprise coil springs having the same diameter, and the former 42 is formed to be larger in diameter than the latter 43.

Both return springs 42, 43 are held at a free length in a non-load state when the transmission lever 3 is at the neutral position N (see FIG. 9). When the transmission lever 3 is manipulated to select the first-second speed select position P12, the larger spring seat 40 is stopped by the case 4 at the flange 40b, while the smaller spring seat 41 is stopped by the lower end of the larger diameter portion 21a of the shift rod 21, to reduce the distance between both spring seats 40, 41, thereby holding the larger return spring 42 in a non-load state and the smaller return spring 43 in a compressed state, respectively (see FIG. 10A). As the shift rod 21 is urged upward in consequence, the transmission lever 3 is urged toward the neutral position N.

When the transmission lever 3 is manipulated to select the fifth-sixth speed select position P56, the interlock 23 pushes up the larger spring seat 40 to reduce the spacing between the lower face of the case 4, which stops the larger return spring 42, and the larger spring seat 40, thereby holding the larger return spring 42 in a compressed state and the smaller return spring 43 in a non-load state, respectively (see FIG. 10B). As the shift rod 21 is urged downward in consequence, the transmission lever 3 is urged toward the neutral position N.

When the transmission lever 3 is manipulated to select the reverse select position PR, both return springs 42, 43 are held in a compressed state, though not shown. As the shift rod 21 is urged downward in consequence, the transmission lever 3 is urged toward the neutral position N.

Next, the operation of the gear shift apparatus 1 according to this embodiment will be described first for the case where the vehicle speed V2 is equal to or lower than a predetermined speed VPs (or when the ignition key is OFF). In this event, the restraint cam 14 is held at the permitting position shown in FIG. 4 with the solenoid 15 held in OFF state. Thus, the select cam 13 can be pivotally moved among the aforementioned four corresponding positions, without being impeded by the restraint cam 14. Consequently, any of the first through sixth speed positions 1st–6th and reverse position R can be selected by selecting any of the four select positions by manipulating the transmission lever 3 for the selection and then shifting the transmission lever 3 to the position.

For purposes of description, an example is taken in which the transmission lever 3 is shifted from the neutral position N to the first speed position 1st. When the transmission lever 3 is at the neutral position N, the select lever 11 is held at the neutral corresponding position shown in FIG. 4 by urging forces of the return springs 42, 43, while the shift arm 24 is coupled to the third-fourth speed shift fork 31. Also, the shift arm 35 is held at the position shown in FIG. 11 by an urging force of the return spring 26, while the cam 24b is stopped by the detent 60 at the central recess 24d thereof.

Figure 5:
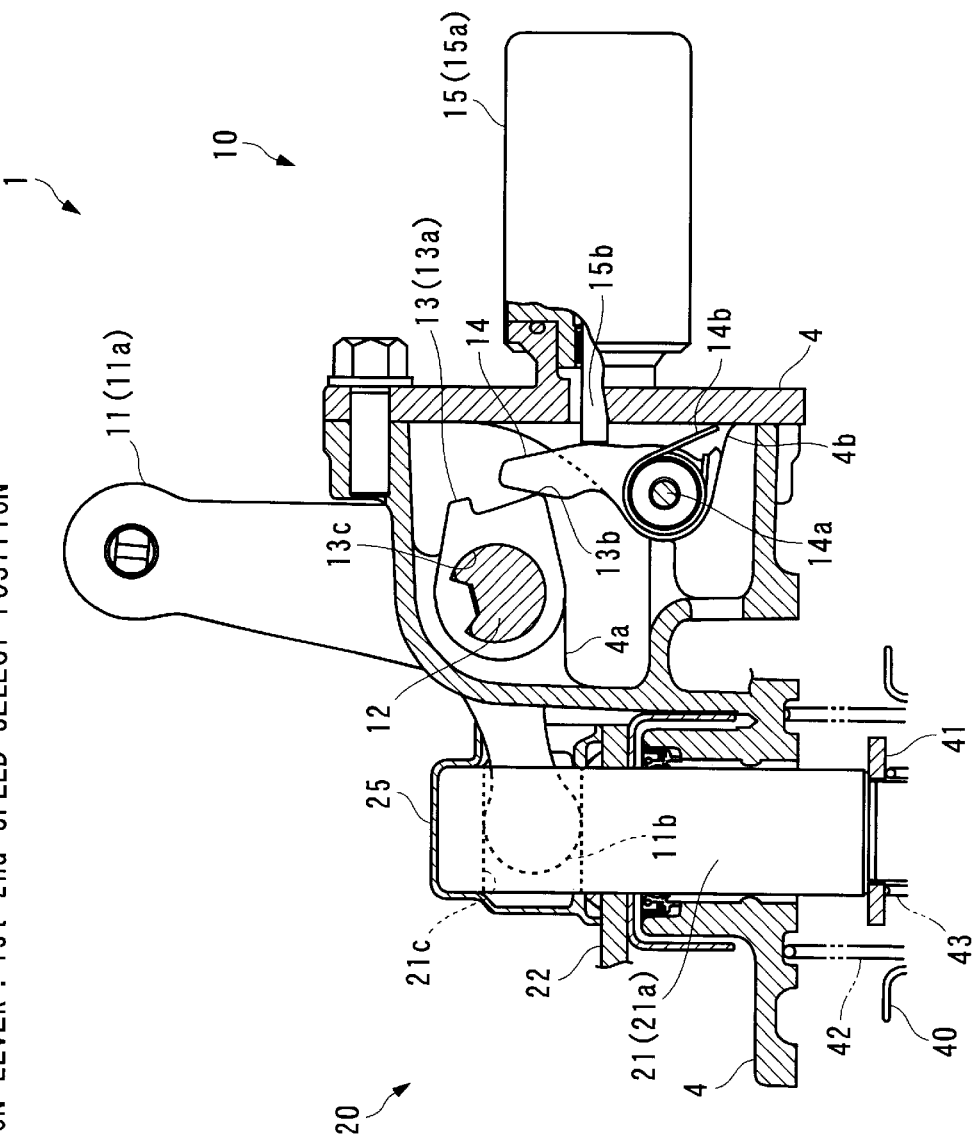
FIG. 5 is a partially cross-sectional side view showing the state of the select lever device when the transmission lever is at a first-second speed select position.

For changing from this state to the first speed position 1st, as the transmission lever 3 is shifted from the neutral position N to the first-second speed position P12 for selecting this position, the select lever 11 connected to the transmission lever 3 through the transmission cable 3a is pivotally moved in the counter-clockwise direction in FIG. 5 to slide the shift rod 21 downward. Associated with this sliding movement of the shift rod 21, the interlock 23 is also slid downward together with the shift arm 24 into contact with the interlock bolt 27 and is stopped at the position shown in FIG. 10A. As a result, the transmission lever 3 is held at the first second speed select position P12. Associated with the sliding movement of the shift rod 21, the arm 24a of the shift arm 24 is fitted into a recess of the piece 30c of the first-second speed shift fork 30.

Next, as the transmission lever 3 is shifted from the first-second speed select position P12 to the first speed position 1st, the shift lever 22 connected to the transmission lever 3 through the transmission cable 3b is pivotally moved about the vertical axis. This pivotal movement of the shift lever 22 causes the shift arm 24 to pivotally move in the counter-clockwise direction in FIG. 11 to slide the piece 30c to the rear, thereby sliding the first-second speed shift fork 30 to the rear. As a result, the first-second speed shift fork 30 drives the synchro-clutch to couple the counter shaft to the main shaft through the transmission gear train which constitutes a first speed gear pair. The gear shift operation from the neutral position N to the first speed position 1st is performed in the foregoing manner, and other gear shift operations are also performed in a similar manner.

Figure 6:
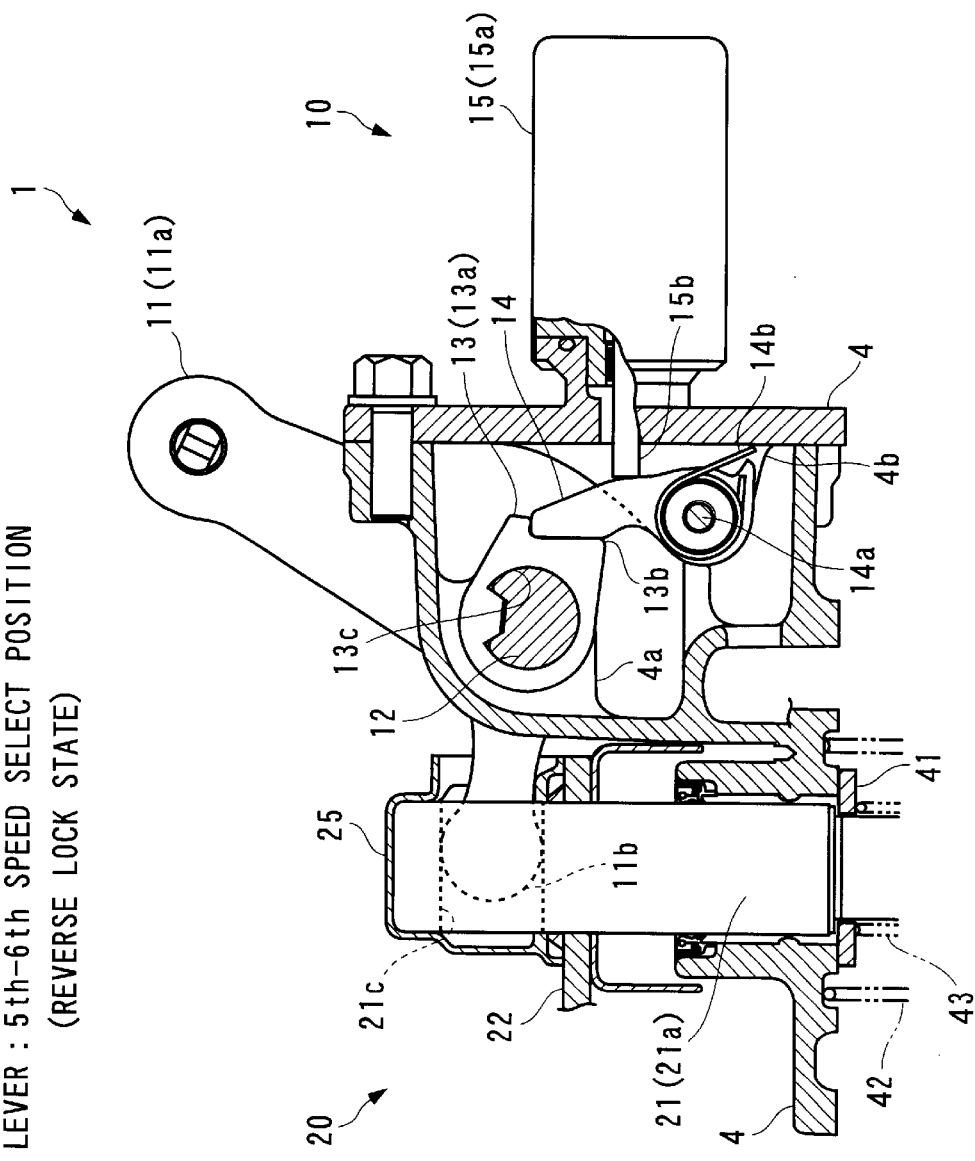
FIG. 6 is a partially cross-sectional side view showing the state of the select lever device when the transmission lever is at a fifth-sixth speed select position and is prevented from shifting to a reverse select position (reverse lock)
Figure 7:
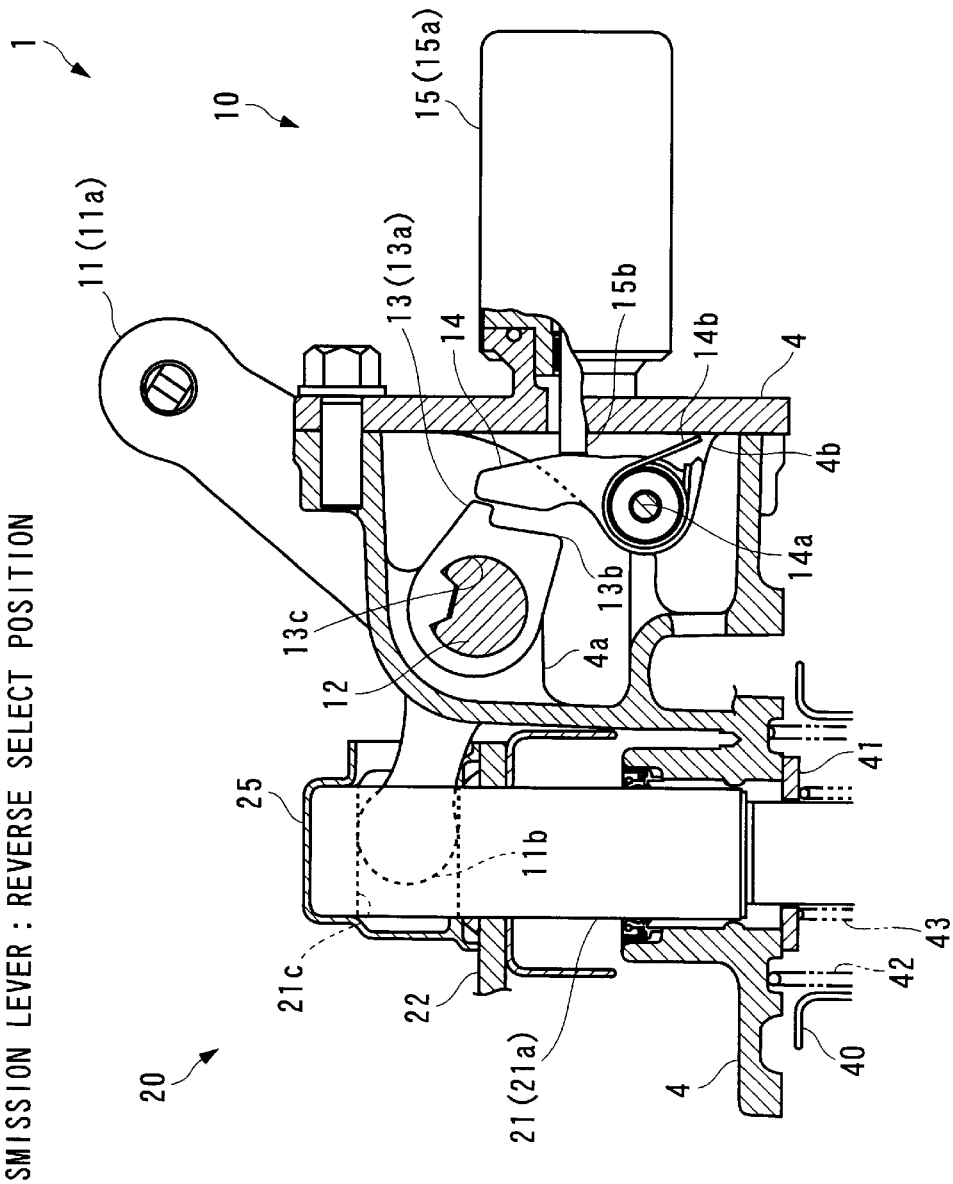
FIG. 7 is a partially cross-sectional side view showing the state of the select lever device when the transmission lever is at the reverse select position.

On the other hand, when the vehicle speed VP is equal to or higher than a predetermined speed VP1, the solenoid 15 is held ON so that the restraint cam 14 is held at the prohibiting position shown in FIG. 6. Thus, as the transmission lever 3 is shifted from the neutral position N to the reverse select position PR for selecting this position, the select cam 13 is pivotally moved in the clockwise direction in FIG. 6 associated with the shifting of the transmission lever 3, and the stop protrusion 13a comes into contact with the restraint cam 14 to hold the select cam 13 at the fifth-sixth speed corresponding position shown in FIG. 6. In this manner, the transmission lever 3 is prevented from moving to the reverse select position PR and is held at the fifth-sixth speed select position P56. In other words, the manual transmission 2 is held in the reverse lock state to prevent a miss shift manipulation to the reverse gear stage.

Figure 13:
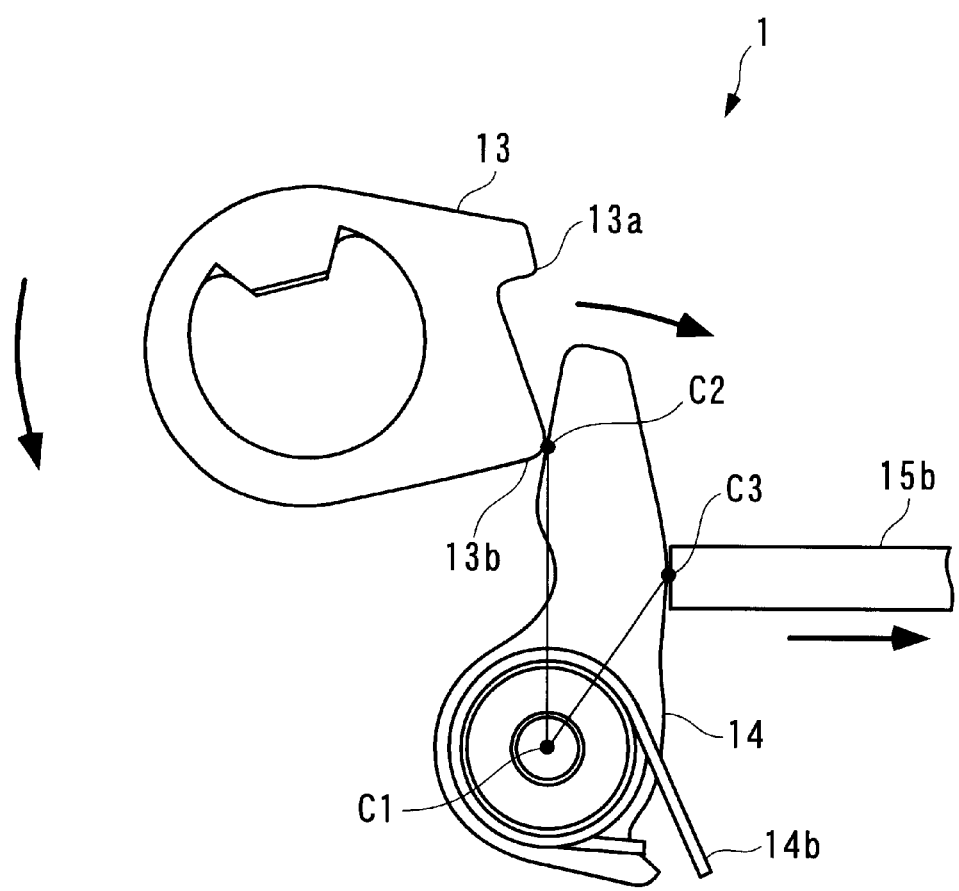
FIG. 13 is a side view showing how a select cam is pivotally moved to release a reverse lock state.

In the reverse lock state, as the transmission lever 3 is shifted from the fifth-sixth speed select position P56 or neutral position N to the first-second speed select position P12 for selecting this position, the select cam 13 is pivotally moved in the counter-clockwise direction in FIG. 13, causing the release protrusion 13b to press the restraint cam 14 toward the solenoid 15 and pivotally move the same in the clockwise direction. Consequently, the plunger 15b of the solenoid 15 is forcedly pushed into the solenoid body 15a. Also, as the release protrusion 13b is moved along the restraint cam 14, the select cam 13 is pivotally moved to the first-second speed corresponding position shown in FIG. 13. As a result, the transmission lever 3 can be moved to the first-second speed select position P12.

In this event, since the select cam 13 and restraint cam 14 are pivotally moved within the same plane as mentioned above, a torque of the select cam 13 is efficiently transmitted to the restraint cam 14. Also, as illustrated in FIG. 13, the distance between the center C1 of the pivotal movement of the restraint cam 14 and a location C2 at which the release protrusion 13b comes into contact with the restraint cam 14 is set longer than the distance between the center C1 of the pivotal movement of the restraint cam 14 and a location C3 at which the plunger 15b comes into contact with the restraint cam 14, so that the restraint cam 14 can be pivotally moved with a smaller torque of the select cam 13 in accordance with the principles of lever.

Also, even at the vehicle speed VP equal to or lower than the predetermined vehicle speed VP2, if the solenoid 15 is stuck with the restraint cam 14 being held at the prohibiting position to give rise to a gear shift disabled state in which the transmission lever 3 is not allowed to shift to the reverse gear stage (hereinafter simply called the "gear shift disabled state"), the transmission lever 3 may be shifted to the first-second speed select position P12 for selecting this position as mentioned above to pivotally move the restraint cam 14 by force to the permitting position, such that the plunger 15b can be forcedly pushed into the solenoid body 15a. In this manner, the gear shift disabled state can be released by force.

As described above, according to the gear shift apparatus 1 of this embodiment, a miss shift to the reverse gear stage can be appropriately prevented in accordance with the vehicle speed VP by controlling the solenoid 15 ON/OFF in accordance with the vehicle speed VP.

Also, as the transmission lever 3 is shifted to the first-second speed select position P12 for selecting this position in the reverse lock state in which the restraint cam 14 is held at the prohibiting position, the plunger 15b can be pushed into the solenoid body 15a together with the restraint cam 14 by the release protrusion 13b of the select cam 13, thereby releasing the reverse lock state or an erroneous gear shift disabled state due to the stuck solenoid 15 in which the transmission lever 3 is prohibited from shifting to the reverse gear stage. In this event, since the select cam 13 and restraint cam 14 are pivotally moved within the same plane, the gear shift disabled state can be forcedly released in an efficient manner through the transmission of a torque from the pivotally moved select cam 13 to the restraint cam 14, as compared with the conventional release operation which relies on the transmission of a horizontal force as a vertical force through a cam face. In addition to this, since the distance between the center C1 of the pivotal movement of the restraint cam 14 and the location C2 at which the release protrusion 13b comes into contact with the restraint cam 14 is set longer than the distance between the center C1 of the pivotal movement of the restraint cam 14 and the location C3 at which the plunger 15b comes into contact with the restraint cam 14, the restraint cam 14 can be pivotally moved with a smaller torque of the select cam 13 in accordance with the principles of lever. For the reasons set forth above, the reverse lock state or the gear shift disabled state due to the stuck solenoid 15, in which the transmission lever 3 cannot be shifted to the reverse gear stage, can be released with a significantly smaller force than before, permitting the driver to have a light gear shift feeling.

The foregoing embodiment has been described in connection with an exemplary shift pattern which has the reverse select position PR arranged outside the fifth-sixth select position P56. The present invention, however, is not limited to this shift pattern but can be applied as well to a shift pattern which has a reverse select position arranged outside a plurality of forward select positions. For example, the present invention can be applied to a shift pattern which has a reverse select position PR outside a first-second speed select position P12, in which case the select cam 13 and restraint cam 14 may be modified in shape. In addition, the number of forward gear stages of the manual transmission 2 is not limited to six in the foregoing embodiment, but may be five or less or seven or more.

Further, the urging means for urging the restraint cam 14 to the permitting position is not limited to the twisted coil spring 14b in the foregoing embodiment, but any means may be employed as long as it can urge the restraint cam 14 to the permitting position. For example, a rubber, an air spring, and the like may be employed instead.

Moreover, the actuator for driving the restraint cam 14 from the permitting position to the prohibiting position is not limited to the solenoid in the foregoing embodiment, but any means may be employed as long as it can drive the restraint cam 14 from the permitting position to the prohibiting position. For example, a pneumatic or hydraulic actuator, and the like may be employed instead.

As described above, according to the gear shift apparatus for a manual transmission of the present invention which utilizes an actuator to prevent a miss shift manipulation from a forward gear stage to a reverse gear stage, the miss shift preventing state can be forcedly released with a smaller force, so that the driver can have a light gear shift feeling.

What is claimed is:

1. A gear shift apparatus for a manual transmission having a shift pattern comprised of a plurality of forward select positions for selecting a plurality of forward transmission gear stages, respectively, and a reverse select position arranged outside said plurality of forward select positions for selecting a reverse transmission gear stage, for selecting one of said plurality of forward transmission gear stages and said reverse transmission gear stage through a selecting manipulation and a shifting manipulation, said gear shift apparatus comprising:

a select cam responsive to said selecting manipulation to pivotally move to a plurality of forward positions and a reverse position corresponding to said plurality of forward select positions and said reverse select position, respectively, to permit a selection by said shift manipulation from said plurality of forward transmission gear stages and said reverse transmission gear stage;

a restraint cam pivotally movable between a prohibiting position at which said restraint cam comes into engagement with said select cam to prohibit said select cam from pivotally moving to said reverse position, and a permitting position at which said restraint cam is retraced from said prohibiting position to permit said select cam to pivotally move to said reverse position;

urging means for urging said restraint cam toward said permitting position;

an actuator coupled to said restraint cam, said actuator having a moving element for driving said restraint cam from said permitting position to said prohibiting position; and prohibition releasing means for pressing said restraint cam into a pivotal movement from said prohibiting position to said permitting position when said select cam is pivotally moved toward a forward position in response to said selecting manipulation toward a forward select position while said select cam is prohibited from pivotally moving to said reverse position by said restraint cam remaining at said prohibiting position.

2. A gear shift apparatus for a manual transmission according to claim 1, wherein the distance between the center of pivotal movement of said restraint cam and a location of said select cam pressed to said prohibition releasing means is set to be longer than the distance between the center of pivotal movement of said restraint cam and a location of said restraint cam contacted to said moving element.

* * * * *